UNITED STATES PATENT OFFICE.

ERHART SCHLEICHER, OF LUDWIGSHAFEN, GERMANY, ASSIGNOR TO THE BADISCHE ANILIN AND SODA FABRIK, OF SAME PLACE.

BASIC YELLOW DYE.

SPECIFICATION forming part of Letters Patent No. 516,577, dated March 13, 1894.

Application filed August 3, 1893. Serial No. 482,294. (Specimens.)

*To all whom it may concern:*

Be it known that I, ERHART SCHLEICHER, doctor of philosophy, a subject of the Duke of Saxe-Meiningen, residing at Ludwigshafen-on-the-Rhine, in the Kingdom of Bavaria and Empire of Germany, have invented new and useful Improvements in the Manufacture of a New Basic Yellow Dye, of which the following is a specification.

It is known that if fluorescein be suitably treated with ammonia, a compound is obtained containing nitrogenous groups instead of the hydroxy groups and oxygen. To this body the formula $C_{20}H_{15}N_3O_2$ and the following constitution

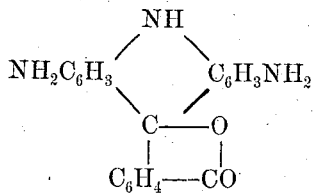

has been attributed (see R. Meyer and Oppelt. *Berichte der Deutschen Chemischen Gesellschaft*, 21, 3376.) This formula must perhaps be slighly modified so as to show a free carboxylic group. This body (which I hereinafter refer to as the initial material) has up to the present time remained useless having found no application in any way in the arts. I have found that by submitting the said initial material to a process of esterification a new and valuable basic dye can be obtained, which yields beautiful gold yellow or orange shades on cotton mordanted with tannin and can be applied in many other ways. By processes of esterification I mean by preference such processes as are employed for the conversion of carboxylic acids into their esters, such for instance as heating with an alcohol in the presence of hydrochloric acid, sulfuric acid and the like.

Chemically my new dye appears to have the composition $C_{20}H_{14}N_3O_2(Alk)$ and the constitution may be represented by the formula

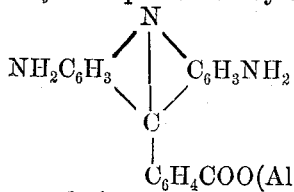

where alk stands for an alcoholic residue, and it may therefore be called diamido-phenyl-acridin-carboxy-alkyl-ester.

The following example will illustrate the manner in which my invention can best be carried into practical effect and my new dye obtained; the parts are by weight. Mix about one part of the purified initial material with ten times the weight of ethyl-alcohol (containing about ninety-six per cent. $C_2H_5OH$) heat the mixture on the water-bath in a vessel fitted with a reflux condenser and pass in a stream of hydrochloric acid gas. A solution of the hydrochlorate is soon obtained. Regulate the heat so that the mixture boils slowly and allow a slight stream of hydrochloric acid gas to pass in continuously until no further production of the desired new dye takes place. This can be ascertained by working up test portions of the mixture in the manner hereinafter described for the whole product. Distill off the hydrochloric acid and alcohol on the water-bath and dissolve the residue in boiling water. Filter and precipitate the dye with common salt. Collect and purify by redissolving in hot water and filtering; then reprecipitate with common salt and collect on the filter. By redissolving in hot water any initial material present becomes converted into the base insoluble in water and is so eliminated. Repeat this purification as often as may be necessary and finally press and dry the purified dye.

Instead of using a vessel fitted with a reflux condenser in the production of the new dye, as hereinbefore described, closed vessels may be used and the esterification effected under pressure. Again in the above example sulfuric acid and other mineral acids acting similarly to hydrochloric acid can be used instead of that acid. Thus for instance heat a mixture of one part initial material, three parts ethyl-alcohol and one and a half parts of concentrated sulfuric acid (containing about ninety-five per cent. $H_2SO_4$) for about nine or ten hours on the boiling water-bath in a vessel provided with an inverted condenser. Work up the product in the same way as hereinbefore described.

Instead of ethyl alcohol, other alcohols, such as methyl and amyl alcohol, glycerin and the like can be used.

My new dye possesses the following properties: it occurs as an orange colored powder soluble in water and alcohol giving red-yellow stable solutions possessing a strong yellowish-green fluorescence; its solution in concentrated sulfuric acid is of a yellow color. If to a strong aqueous solution of the dye a mineral acid be added an orange precipitate is obtained; sodium acetate, soda and other alkalies precipitate the dye-base from solutions. The dye-base is soluble in benzene, ether and the like.

If a solution of my new dye be poured into an excess of boiling dilute caustic soda solution a momentary precipitate is formed which redissolves. On neutralizing the solution with acetic acid a crystalline precipitate is formed. On treating the dye in aqueous solution with nitrous acid a diazo-compound is obtained.

My new dye fixes itself on cotton mordanted with tannin and on leather giving brilliant clear shades of yellow to orange.

What I claim as new, and desire to secure by Letters Patent, is—

As a new article of manufacture the new gold yellow or orange dye, a diamido-phenyl-acridin-carboxyl-alkyl ester, soluble in alcohol and in water giving red yellow stable solutions possessing a strong yellowish-green fluorescence; on treatment of the aqueous solution with boiling dilute soda solution a momentary precipitate is formed which redissolves giving a solution from which a crystalline precipitate is deposited on neutralization with acetic acid substantially as described.

In testimony whereof I have hereunto set my hand in the presence of two subscribing witnesses.

ERHART SCHLEICHER.

Witnesses:
ERNEST F. EHRHARDT,
ADOLPH REUTLINGER.